Jan. 24, 1939.  H. A. DOUGLAS  2,145,161
CONTROL APPARATUS
Original Filed April 30, 1935  2 Sheets—Sheet 1
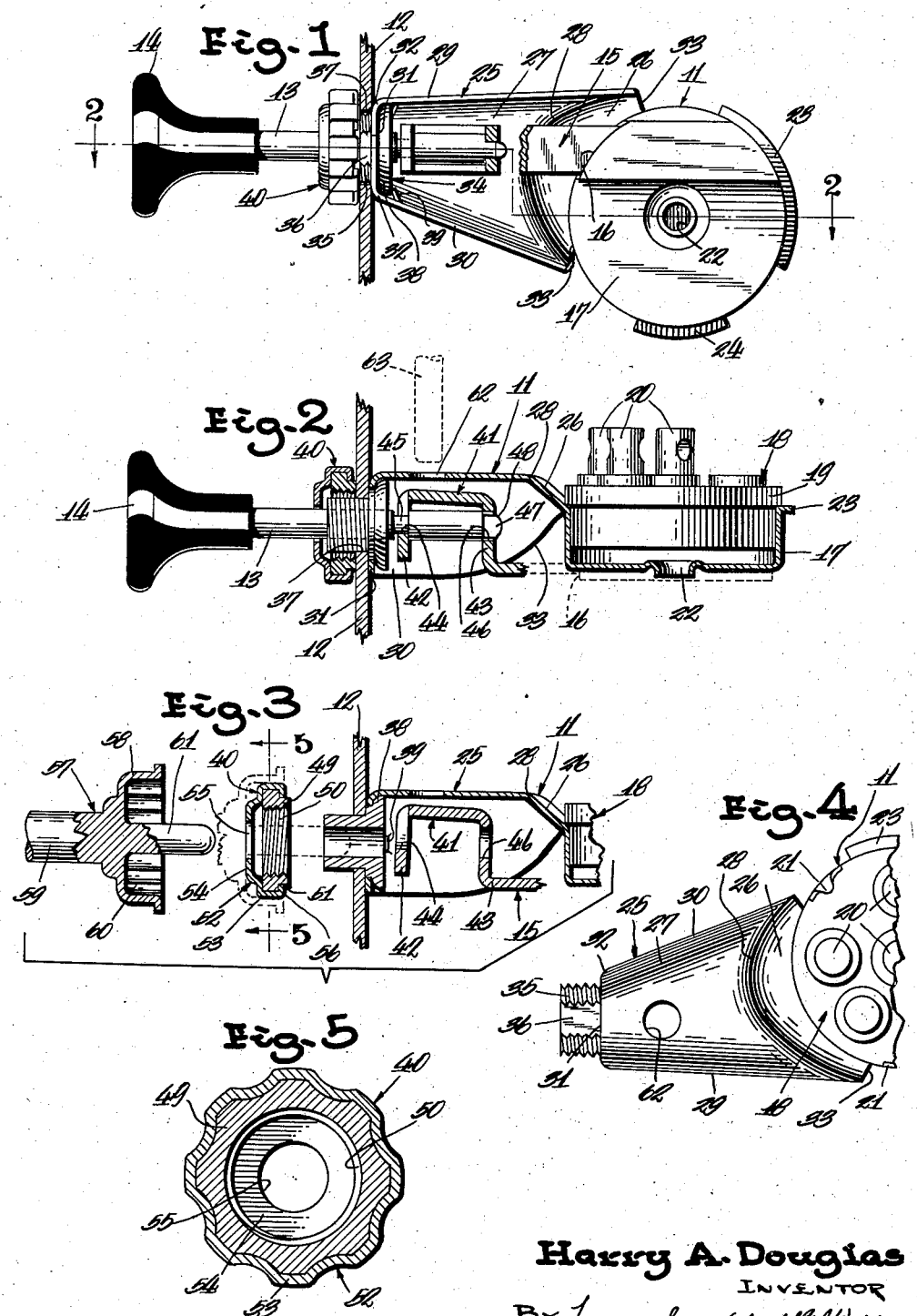
Harry A. Douglas
INVENTOR
ATTORNEYS Jan. 24, 1939.  H. A. DOUGLAS  2,145,161
CONTROL APPARATUS
Original Filed April 30, 1935  2 Sheets-Sheet 2
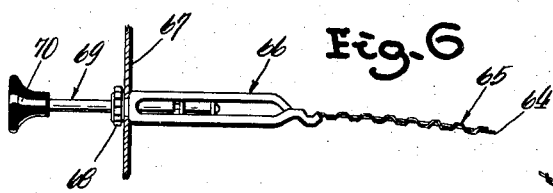
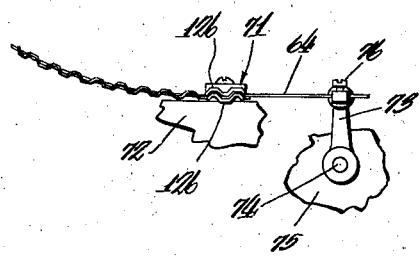
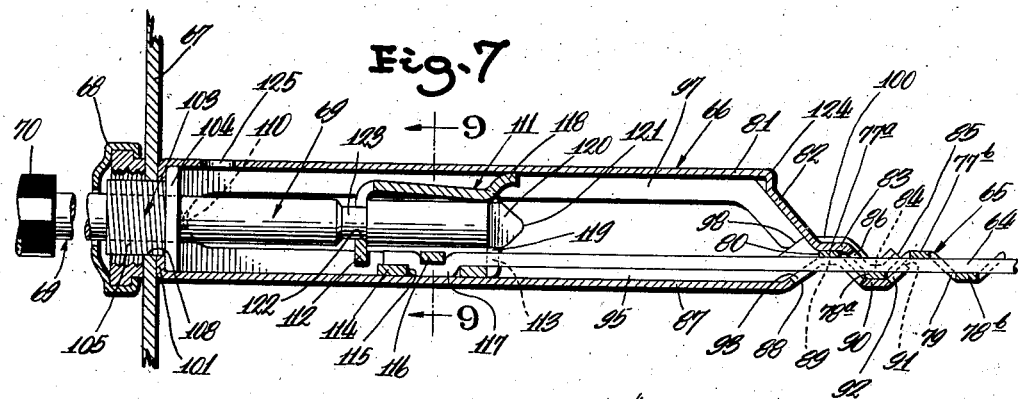
Harry A. Douglas
INVENTOR
BY Freeman, Sweet, Albrecht and Weidman
ATTORNEYS Patented Jan. 24, 1939

2,145,161

UNITED STATES PATENT OFFICE 2,145,161

CONTROL APPARATUS

Harry A. Douglas, Bronson, Mich., assignor to Kingston Products Corporation, a corporation of Indiana Application April 30, 1935, Serial No. 19,122
Renewed July 21, 1938

20 Claims. (Cl. 74—502)

My invention relates to control apparatus, and may be embodied in or used in connection with electric switches, choke controls for internal combustion engines, throttle controls, or other control apparatus. In its more specific aspects my invention relates to control apparatus, or operating means for control apparatus which is mountable on a panel. The principal object of my invention is to provide new and improved apparatus of these types. This application is a continuation in part of my application Serial Number 1,525, filed January 12, 1935.

In the drawings accompanying this specification, and forming part of this application, I have shown for purposes of illustration, several forms which my invention may assume, and in these drawings:

Figure 1 is a side elevation of an electric switch embodying my invention, with a part broken away for the sake of clearness, Figure 2 is a section taken on the line 2—2 of Figure 1, looking in the direction of the arrows, Figure 3 is a detail fragmentary view of some of the parts shown in Figures 1 and 2, disassembled, and ready to be assembled by a tool, Figure 4 is a fragmentary plan view of a detail, Figure 5 is an enlarged sectional view, taken along the line 5—5 of Figure 3, looking in the direction of the arrows, of a detail, Figure 6 is a side elevation of a valve or choke control embodying my invention, parts being fragmentarily shown, Figure 7 is an enlarged longitudinal vertical sectional view of a portion of the apparatus shown in Figure 6, Figure 8 is a perspective view of a detail, Figure 9 is a sectional view taken along the line 9—9 of Figure 7, looking in the direction of the arrows, and Figure 10 is a plan view of a detail of the apparatus shown in Figure 6.

Referring to Figure 1 of the drawings there is here shown a switch unit 11 mounted on a panel 12, the switch unit being provided with an actuator 13 extending through the panel. The actuator may be provided with a knob 14.

The switch unit is provided with operating means 15, in this case a longitudinally reciprocable bar extending into an aperture 16 in the side of and near the bottom of a casing 17. The casing 17 is here shown as generally cylindrical and of cup-shape, adapted to receive a switch 18 having a base 19. The base 19 may be provided with terminals 20 extending therethrough and electrically cooperable with movable switch elements (not shown). The switch 18 may be held in the casing 17 by providing the casing 17 with a plurality of tongues 21, at the upper edge of the casing, and clinching the tongues over the base 19, as may be seen in Figure 4. In this instance the bottom of the cup-shaped casing may be provided with an aperture 22, adapted to journal a rotatable portion of the switch mechanism. The casing may be provided at its upper edge with laterally extending flanges 23, 24. It is to be understood that the term upper and like terms are merely relative and not to be taken as limiting the parts to any particular position with respect to a horizontal plane.

The casing 17 may be supported from the panel 12 by means of a bracket 25, of generally channel-shaped cross-section, and having a general surface of skew form. The bracket 25 comprises a portion 26 of cone-like or conoidal form, the flaring portion of the conoidal surface merging into the cylindrical portion of the casing 17 at the upper edge of the latter. The bracket 25 further includes a generally conoidal portion 27, the flaring portion of which merges with the tapering portion of the conoidal portion 26, the junction of these merging portions forming a rounded crest 28, the locus of which is generally in the form of a conic section. The conoidal portions 26, 27 are reversely curved, the portion 26 being concave and the portion 27 being convex, viewing the outside of the channeled bracket, as in Figure 4. The bracket 25 is here shown as having plane sides 29, 30, merging into the conoidal portion of the bracket, and extending from the flaring ends of the conoidal portion 26 to and merging into a plane transverse end 31 forming a closure for the tapering end of the bracket 25. The plane end 31 is joined by a curved or fillet portion 32 to the plane sides 29, 30 and to the conoidal portion 27. The plane sides 29, 30 are here shown as being cut away at their ends nearest the casing 17 to form curved edges 33 which lead to the flaring ends of the conoidal portion 26.

Mounted at the end 31 of the bracket 25 is a threaded nipple 34 having an externally threaded portion 35. The portion 35 has diametrically opposite faces 36 cut away to form flat surfaces, and the panel 12 is provided with an aperture 37 of the same shape as the cross-section of the threaded portion 35 of the nipple, so that when the nipple is inserted through the aperture 37 the nipple will be prevented from turning in the aperture. The nipple is provided with a flange 38 seated against the inside surface of the transverse end wall 31 of the bracket, the flange being provided with a rounded edge to conform to the inner surface of the rounded portion 32. The nipple 34 may be held in the bracket by striking in portions 39 of the plane sides 29, 30.

A threaded nut 40 is adapted to be screwed onto the threaded portion of the nipple 34 projecting through the panel 12.

The actuator 13, which is desirably a generally cylindrical rod, is adapted to pass through the nut 40, the bore in the nipple 34, and into apertures in a U-shaped member 41 forming part of the operating means 15. As viewed in Figure 2 the portion 41 forms an inverted U, having legs 42, 43, disposed within the channel of the bracket 25. The leg 42 is provided with an aperture 44 large enough in width to pass the actuator 13. The aperture 44 may have its lower end, as viewed in Figure 2, rounded, to better engage the rounded surface of a reduced portion 45 of the actuator 13. To permit of relative lateral movement as between the actuator 13 and the leg 42, the aperture 44 is extended upwardly, as viewed in Figure 2. The end of the actuator 13 is provided with a reduced part 47, which is desirably non-circular in cross-section, formed by cutting away diametrically opposite portions. The reduced part 47 is adapted to fit an opening 46, of rectangular cross-section, in the leg 43. The reduced part 47 has its end desirably tapered so as to form a generally V-shaped cam surface 48, in this instance rounded or U-shaped.

The nut 40 comprises a portion 49 of steel having a threaded bore 50. The face of the portion 49 directed toward the panel 12 has its outer periphery undercut at 51. The periphery of the portion 49 is desirably of corrugated form, as can be seen most clearly in Figure 5. The nut is provided with a sheath 52, desirably of some readily workable metal such as brass and which is also adapted to be suitably plated and finished. The sheath 52 is generally of cup-shape, the peripheral portion 53 being pressed or swedged onto the steel portion 49, to assume a corrugated outside surface corresponding to the corrugated surface of the steel portion 49. The end 54 of the sheath is spaced a desired distance from the opposed face of the portion 49. The end 54 of the sheath is desirably provided with an aperture 55, of less diameter than the threaded bore 50, for a purpose which will appear. The sheath may be provided with axially extending tongues 56 which are clinched over the crests of the corrugations on the portion 49 and into the undercut periphery 51 of the portion 49. The relative axial depth of the undercut portion 51 with respect to the thickness of the sheath 52 is such that the face of the nut adapted to be set up against the panel 12 projects axially beyond the clinched portions 56.

The nut 40 is particularly adapted for use with a socket wrench 57 having a socket member 58 provided in any suitable manner with an operating shank 59. The inside peripheral surface of the socket is provided with corrugations 60 complementary to the corrugations formed by the peripheral portion 53 of the nut. The wrench 57 is further desirably provided with a pin or projection 61, centrally located in the socket.

In order to screw the nut 40 onto the nipple 34, the pin 61 is inserted through the aperture 55 of the nut, to bring the corrugated inner periphery of the socket of the wrench into engagement with the corrugated outer periphery of the nut. The pin 61 then projects beyond the right hand face of the nut 40, as viewed in Figure 3. The fact that the pin 61 projects beyond that face of the nut enables the pin to enter the bore of the nipple 34 before the threaded bore 50 is started on the thread of the nipple. The shank 59 of the wrench is then turned in any suitable manner thereby screwing the nut 40 onto the nipple 34 and setting it up tight against the panel 12. During this operation the wrench is prevented from slipping off of the nut by the pin 61. The pin 61 also facilitates the threaded engagement of the nut 40 with the nipple.

The panel 12 is usually provided with a finish which would be marred, if the wrench were to slip off of the nut and come in contact with the panel, or if the nut were to slip off of the nipple in the threading operation and come into contact with the panel. Furthermore, while the face of the nut which is set up against the panel may mar the finish thereof, this marred portion cannot be seen by reason of the fact that the face of the nut engaging the panel does not extend to the outer periphery of the nut but only up to the undercut portion 51, and any marred portion is therefore covered by the portions of the nut 40 extending radially outwardly beyond the undercut face.

The fact that the end portion 54 of the sheath is spaced axially from the opposed face of the threaded portion 49 permits of considerable variation in the length of the threaded portion of the nipple which projects beyond the panel 12.

When the nut 40 has been tightened against the panel, the parts are ready to have the actuator 13 assembled therewith. Before the actuator is assembled with the operating means, the U-shaped part 41 is somewhat above the position it assumes after the actuator is assembled therewith. In order to assemble the actuator with the operating means, it is only necessary to thrust the actuator through the opening 55 in the nut, the actuator first passing through the nipple 34 against the leg 42 of the U-shaped part 41. The U-shaped part 41 being somewhat above its position shown in Figure 2, the bottom of the aperture 44 is not in alignment with the lower edge of the actuator 13. Therefore one side of the generally V-shaped cam surface 48 at the end of the actuator is in contact with the margin of the bottom of the aperture 44, and consequently when the actuator 13 is moved to the right, the U-shaped portion 41 will be moved downwardly, against the bias of the entire operating means 15, so that the actuator 13 can then pass through the aperture 44. Further motion of the actuator 13 to the right brings the reduced portion 47 to the aperture 46, and if the reduced portion 47 is brought into register with that aperture, it may be thrust into the aperture, bringing the shoulder of the reduced portion against the leg 43. At the same time the leg 42 is free to snap off of the larger section of the actuator 13 into the notch or reduced part 45. The parts are then in the position shown in Figures 1 and 2. The actuator is now securely latched to the operating means 15, and by pushing against the knob 14 the shoulder of the reduced portion 47 pushes against the leg 43 thereby moving the operating means 15 to the right as viewed in Figure 2. On the other hand, pulling on the knob 14 causes the shoulder of the notch 45 to pull against the right hand side of the leg 42 thereby moving the operating means 15 to the left.

Engagement of the reduced portion 47 with the aperture 46 prevents the actuator 13 from turning or tilting. It will be noted that the actuator cannot be brought into latched relation with the aperture 44 until the reduced portion 47 is fully inserted in the aperture 46.

The operating means 15 itself has sufficient resilience to act as means for biasing the latch formed by the leg 42 and the notch 45 into latched position.

Inasmuch as thrust and pull on the operating means 15 tends to bend the casing 17 with respect to the bracket 25, and with respect to the panel, it is important that the casing and bracket assembly be made rigid enough to resist these bending effects. At the same time heavy parts require more material, increase manufacturing difficulties, and are generally more expensive. The casing and bracket construction hereinbefore described requires only relatively thin sheet stock and yet is very rigid and strong.

It is also desirable to provide a rigid casing and bracket assembly so that the actuator 13 may be readily disconnected from the operating means 15 without distorting the parts. In order to disconnect the actuator 13 from the operating means 15, the parts are first brought to the position shown in Figure 2, by pulling the knob 14 out to its full extent, and then pressing downwardly against the upper part of the U-shaped member 41 so as to disengage the bottom of the aperture 44 from the notch 45, whereupon the actuator 13 may be freely removed from the rest of the apparatus. In the embodiment shown in Figures 1 through 4, presure may be applied against the U-shaped member 41 by inserting through an opening 62 in the bracket 25 a suitable rod or pin 63. By pushing against the U-shaped member 41 the operating means 15 can be caused to spring sufficiently to release the latch, without bending the casing 17 or the bracket 25.

Referring now to Figure 6, this shows my present invention in connection with my invention shown and claimed in my copending application Serial Number 115,241, filed December 10, 1936, which may, for example, be used in the control of a choke for an internal combustion engine, or for a throttle control, or for controlling any movable member. The control apparatus shown in Figure 6 is provided with operating means here shown as a wire 64. The wire 64 is provided with supporting means 65. The supporting means 65 comprises, in this instance, an undulating or corrugated strip of metal having apertures through the sides of the corrugations, between the crests and the troughs thereof, through which the wire 64 is threaded, and by which apertures strip the wire 64 is supported against lateral movement and buckling, when it is moved longitudinally relatively to the apertured strip. One end of the wire supporting means 65 includes a casing or housing 66, also serving as a bracket. The housing 66 is mounted on a panel 67 and fastened thereto by means of a nut 68. An actuator 69, provided with a knob 70, is adapted, when moved back and forth, to move the wire 64 back and forth. The other end of the supporting means 65 may be held stationary by means of a clamp 71 fastened to a stationary suport 72. The wire 64 is here shown as having its end operatively related to a crank 73 mounted on a pivoted shaft 74 on a support 75. The wire 64 will be fastened to the crank 73, as by providing an aperture in the end of the crank through which the wire passes and then fastening the wire in the aperture by means of a set screw 76. The shaft 74 may operate a valve or any other desired device.

One end of the corrugated supporting strip 65 may be fastened to the housing 66 in the following manner. It will be observed by reference to Figure 7 that the end of the corrugated strip is interposed between walls of the housing 66. The corrugations of the strip are here shown as having flat crests 77a, 77b, and so on and flat troughs 78a, 78b, and so on. The inclined portions joining the flat troughs and crests are provided with longitudinally extending apertures 79. The corrugated strip terminates at the left hand side 80 of the crest 77a. The casing 66 has a top wall 81 and a downwardly inclined tapering end wall 82 merging into a reduced portion 83, of the same width as the strip 65. The reduced top wall portion 83 is corrugated complementary to the strip 65, so that it nests on top of the strip and has a portion directly overlying the crest 77a, continues downwardly to a trough portion 84 lying in the trough 78a and from there upwardly toward the crest 77b, terminating at 85, before it reaches the crest 77b. An aperture 86 is formed in the reduced top wall portion 83, extending from the right hand side of the portion of the wall 83 overlying the crest 77a, to the end 85, thus permitting free passage of the wire 64 through the apertures 79 in the corrugated strip.

The casing 66 has a bottom wall 87, one end of which is reduced in width to correspond to the width of the corrugated strip 65. The reduced portion of the bottom wall 87 is corrugated complementarily to the corrugated strip 65, so that the corrugated part nests underneath the strip 65 and has a portion 88 inclined upwardly, merging into a crest 89 directly underlying the crest 77a, continues downwardly to a trough portion 90 directly underlying the trough 78a and thence upwardly to its end 91, short of the underside of the crest 77b.

The reduced corrugated portion of the bottom wall 87 is provided with an aperture 92 extending from the right hand side of the trough portion 90 to the end 91. It is also provided with an aperture 93 extending from substantially the beginning of the inclined portion 88 to and through the crest 89 and terminating short of the trough 90. The apertures 86, 92, 93, in general, are so designed that the wire 64 will be permitted to freely pass through the apertured corrugated strip 65 without interference from the extended corrugated portions of the upper and lower walls 81, 87 which clasp the corrugated strip.

The bottom wall 87 of the housing 66 is here shown as channel-shaped in cross-section, being provided with upwardly extending flanges 94, 95. Similarly, the upper wall 81 of the housing is channel-shaped in cross-section, being provided with downwardly extending flanges 96, 97. The flanges 96, 97 extend longitudinally along the edges of the upper wall 81 and also along the inclined end 82 of the wall 81. The portions of the flanges 96, 97 provided on the inclined end wall 82 terminate, at 98, at approximately the upper edges of those portions of the flanges 94, 95 which extend upwardly from the margins of the inclined portion 88 of the corrugated portion of the lower wall 87. The flanges 94, 95 are made deep enough so that their upper margins 99, 100 may be crimped or staked over the adjacent margins of the corrugated portion of the extension of the wall 82.

The housing 66 is also provided with a transverse end wall 101 at the end opposite from the end clamping the corrugated strip. The end wall 101 is also provided with flanges 102, which are continuations of the flanges 94, 96 and 95, 97. The housing 66 is desirably made of a single piece of sheet metal. The upper and lower walls 81, 87 and their flanges 96, 97 and 94, 95, and the transverse wall 101 and the upper and the lower walls 81, 87, and the transverse wall 101 and its flanges 102 are preferably formed so as to provide rounded joints between them.

In order to fasten the housing 66 to the panel 67 a threaded nipple 103 is provided, having a square head 104 fitting within the housing 66. The nipple 103 has an exteriorly threaded portion 105 provided with diametrically opposite flats 106, and extends through an aperture 107 of similar cross-sectional outline in the transverse end wall 101. The nipple 103 also extends through an aperture 108 in the panel 67 and is thus fastenable to the panel by the nut 68 in a manner already described in connection with the embodiment of Figures 1 through 5, the nut 68 being identical with the nut 40. The threaded nipple 103 may be retained in position in the housing 66 by staking. To that end the margins of the flanges 102 are in this instance locally pressed inwardly at places 110, to engage the top of the head 104.

The wire 64 and the actuator 69 may be detachably connected by a connection means having a U-shaped part 111, similar to the U-shaped portion 41 of the embodiment of Figures 1 through 5. The U-shaped part 111 has downwardly extending legs 112, 113, but in this instance the leg 113 is provided with a guide portion 114 at the end thereof and extending at right angles thereto, almost closing the open end of the U formed by the portion 111. The guide portion 114 is slidable on the bottom wall 87 between the flanges 94, 95 and also serves as means for connecting the end of the wire 64. For this purpose, the guide 114 is provided with an aperture 115 across which extends a cross bar 116, integral with the guide 114. The cross bar 116 is disposed above the upper surface of the guide 114 and the end of the wire 64 is positioned between the upper surface of the guide 114 and the lower surface of the cross bar 116, the cross bar 116 being then pressed downwardly so as to form a U-shaped portion 117 in the wire 64. The wire 64 is thus firmly held to the guide 114.

The connection means including the U-shaped portion 111 is further guided by means of a guide 118, which is desirably formed by a portion of the leg 113, struck out from that leg and bent upwardly, inclining upwardly toward the under surface of the top wall 81 of the housing 66. The end of the guide 118 is bent out of the inclined direction so as to form a substantially horizontal upper surface in slidable engagement with the under surface of the top wall 81. The struck out guide 118 leaves an aperture 119 in the leg 113, the aperture 119 extending to the lower end of the leg 113, to its junction with the guide portion 114. The aperture 119 thus serves to admit the wire 64 to its place of connection with the guide 114. The aperture 119 has parallel vertically extending margins spaced sufficiently to permit of the passage of a reduced end 120 of the actuator 69. The reduced end 120 is similar to the reduced end 47 of the actuator 13 in the embodiment of Figures 1 through 5 and is similarly provided with a V-shaped cam 121. The leg 112 is provided with an aperture 122, identical with the aperture 44 in the leg 42 of the embodiment of Figures 1 through 5. The aperture 122 cooperates with an annular notch 123 in the actuator 69.

The upper part of the inclined end wall 82 is desirably provided with a vertically extending abutment 124, formed by pressing out the end wall locally, forming a recess triangular in longitudinal cross-section, one of the sides of the recess being a continuation of the underside of the top wall 81 and the other side extending at right angles thereto.

The top wall 81 may be provided with a hole 125, preferably positioned near the panel 67, serving to admit any convenient element, for engagement with the top of the U-shaped part 111, to disconnect the actuator 69 from the rest of the apparatus, as has been hereinbefore described in connection with the element 63.

The clamp 71 may be formed by providing a flat plate 127 with a pressed end 126 formed into a shape complementary to a portion of the top surface of the corrugated strip 65, along with another plate identical with the plate 127 and having its pressed end 126 complementary with the underside of the corrugated strip 65 at the same place. Desirably, the clamp is formed by making the two clamping plates in one piece folded at the end 128 opposite from the pressed ends 126. The clamp 71 may be clamped to the corrugated strip 65 and fastened to any convenient stationary member 72 by a screw 129 passing through apertures in the clamp plates 127 and threaded into the stationary portion 72.

It will be evident that if the actuator 69 is pulled to the left, as viewed in Figure 7, the shoulder of the notch 123 will pull the U-shaped portion 111, along with the guide 114 and the wire 64 attached thereto, toward the left and therefore swing the crank 73 in a counterclockwise direction. On the other hand, if the actuator is pushed toward the right, the shoulder formed by the reduced portion 120 engages the leg 113 thereby pushing the guide 114 and the wire 64 toward the right, thereby swinging the crank 73 in a clockwise direction. Motion of the parts toward the right is limited by engagement of the guide 118 with the abutment 124.

As in the case of the embodiment of Figures 1 through 5, the control apparatus of the embodiment of Figures 6 through 10 may be unitarily formed ready for quick and easy mounting on a panel, the actuator 69, 70 being assemblable with the rest of the apparatus by merely thrusting it through the nut 68, in a manner already described in connection with Figures 1 through 5.

From the foregoing it will be apparent to those skilled in the art that the illustrated embodiments of my invention provide new and improved control apparatus, readily and conveniently constructed and assembled, and accordingly, accomplish at least the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. Control apparatus, including: operating means, movable in a predetermined direction;

means for actuating said operating means, said means being movable in said predetermined direction, and turnable about said direction as an axis; said operating means and actuating means including means whereby said actuating means and operating means are quickly detachably connected, said connection including latch means; means, other than said latch means, for preventing said turning of said actuating means while in latched relation; and means for preventing latching of said actuating means until said means for preventing turning has become effective.

2. Control apparatus, including: operating means, movable in a predetermined direction; means for actuating said operating means, said means being movable in said predetermined direction, and tiltable with respect to said direction; said operating means and actuating means including means whereby said actuating means and operating means are quickly detachably connected, said connection including latch means; means for positively preventing said tilting of said actuating means while in latched relation; and means for preventing latching of said actuating means until said means for preventing tilting has become effective.

3. In apparatus, mountable on a support, for moving a controlling device: operating means for said device movable in a predetermined direction; housing means for receiving said operating means; actuating means so constructed and arranged that movement of said actuating means positively moves said operating means; said operating means and actuating means including means so constructed and arranged that said operating means and actuating means are quickly disconnectable by lateral pressure on said operating means; said housing means being so constructed and arranged that it is rigid, to resist bending effects, put upon it by said operating means, due to said lateral pressure.

4. Control apparatus, including: operating means, extending in a predetermined direction; means for actuating said operating means; said operating means and actuating means including connecting means so constructed and arranged that said actuating means and operating means are quickly detachably connected solely by relative movement of said operating means and actuating means, said connecting means including latch means adapted to transmit force in one direction of movement of said actuating means, and abutment means adapted to transmit force in the other direction of movement of said actuating means.

5. Control apparatus, including: supporting means; operating means, supported by said supporting means, so constructed and arranged that it is biased to a predetermined position with respect to said supporting means; actuating means so constructed and arranged that movement of said actuating means positively moves said operating means; said operating means and actuating means including connecting means so constructed and arranged that said actuating means and operating means are quickly detachably connected, said connecting means including latch means biased to latched position by said operating means.

6. Control apparatus, including: operating means, movable in a predetermined direction; means for actuating said operating means, said means being movable in said predetermined direction, and turnable about said direction as an axis; said operating means and actuating means including connection means whereby said actuating means and operating means are quickly detachably connected by relative movement of said operating means and said actuating means along said general direction; said connection means including latch means; means for preventing said turning of said actuating means while in latched relation; and means for preventing latching of said actuating means until said means for preventing turning has become effective.

7. Control apparatus, including: operating means, movable in a predetermined direction; means for actuating said operating means, said means being movable in said predetermined direction, and tiltable with respect to said direction; said operating means and actuating means including means whereby said actuating means and operating means are quickly detachably connected by relative movement of said operating means and said actuating means along said general direction; said connection including latch means; means for preventing said tilting of said actuating means while in latched relation; and means for preventing latching of said actuating means until said means for preventing tilting has become effective.

8. In apparatus, mountable on a support, for moving a controlling device: operating means for said device movable in a predetermined direction; housing means for receiving said operating means; actuating means so constructed and arranged that movement of said actuating means positively moves said operating means; said operating means and actuating means including connecting means; said connecting means, including a latch and a keeper, so constructed and arranged that said operating means and actuating means are quickly disconnectable by pressure on said latch; said housing means being so constructed and arranged that it is rigid, to resist bending effects, put upon it by said operating means, due to said pressure.

9. Control apparatus, including: operating means, extending in a predetermined direction; actuating means, connected to said operating means, and so constructed and arranged that movement of said actuating means positively moves said operating means; said operating means and said actuating means including connecting means so constructed and arranged that said actuating means may be quickly operatively connected with said operating means by relative movement of said actuating means and said operating means in said predetermined direction, and so that said relative movement causes said operating means to move laterally to said predetermined direction during said relative movement.

10. In combination: control apparatus including operating means and supporting means for said operating means; actuating means, connected to said operating means, and constructed and arranged to actuate said operating means; a panel having an aperture; means for mounting said supporting means on one side of said panel; and connecting means, including a portion of said operating means having an opening the axis of which is approximately coaxial with the axis of said aperture, so constructed and arranged that said actuating means may be operatively connected to said operating means, solely by inserting said actuating means through said aperture from the other side of said panel and into said opening by bodily longitudinal movement of said actuating means.

11. Control apparatus, including: operating means movable in a predetermined direction; actuating means, connected to said operating means, so constructed and arranged that movement of said actuating means positively moves said operating means; said operating means and actuating means including means so constructed and arranged that said actuating means may be quickly operatively assembled with said operating means by solely bodily relative longitudinal movement of said operating means and said actuating means in said predetermined direction, and quickly disconnected from said operating means to remove said actuating means from said apparatus.

12. Control apparatus, including: an operating member, extending in a predetermined direction; an actuating member; connecting means, for said operating member and said actuating member, so constructed and arranged that movement of said actuating member positively moves said operating member in said predetermined direction; said connecting means including a latch on one of said members and a keeper for said latch on the other of said members, so constructed and arranged that said actuating means so moves said operating means by transmission of force through said latch and said keeper, and said operating member and said actuating member are quickly disconnectable solely by lateral pressure on said latch.

13. Control apparatus, including: operating means; actuating means for moving said operating means; connecting means for said operating member and said actuating member, said connecting means comprising latch means including a U-shaped portion having apertures in the sides thereof through which said actuating means is disposed, said latch means being so constructed and arranged that said operating means and said actuating means are quickly detachably connectable.

14. In apparatus, mountable on a support, for moving a controlling device: flexible force-transmitting means, including an elongated flexible member, constructed and arranged to transmit force to the controlling device; terminal means, connected to one end of said flexible member, constructed and arranged to move said member longitudinally; housing means constructed and arranged to guide said terminal means for rectilinear movement and for guiding said flexible member; actuating means so constructed and arranged that movement of said actuating means positively moves said terminal means; said terminal means and said actuating means including means so constructed and arranged that said terminal means and actuating means are quickly disconnectable by lateral pressure on said terminal means; said housing means being so constructed and arranged that it is rigid, to resist bending effects, put upon it by said terminal means, due to said lateral pressure.

15. In apparatus, mountable on a support, for moving a controlling device: flexible force-transmitting means, including an elongated flexible member, constructed and arranged to transmit force to the controlling device; terminal means, connected to one end of said flexible member, constructed and arranged to move said member longitudinally; housing means constructed and arranged to guide said terminal means for rectilinear movement and for guiding said flexible member; actuating means so constructed and arranged that movement of said actuating means positively moves said terminal means; said terminal means and said actuating means including connecting means; said connecting means, including a latch and a keeper, so constructed and arranged that said terminal means and actuating means are quickly disconnectable by pressure on said latch; said housing means being so constructed and arranged that it is rigid, to resist bending effects, put upon it by said terminal means, due to said pressure.

16. Control apparatus, including: flexible force-transmitting means, including an elongated flexible member, constructed and arranged to transmit force to a desired point; terminal means, connected to one end of said flexible member, constructed and arranged to move said member longitudinally; means guiding said terminal means for rectilinear movement; actuating means, connected to said terminal means, and so constructed and arranged that movement of said actuating means positively moves said terminal means; said terminal means and said actuating means including connecting means so constructed and arranged that said actuating means may be quickly operatively connected with said terminal means by relative substantially rectilinear movement of said actuating means and said terminal means in the direction for which said terminal means is guided, and so that said relative movement causes at least a portion of said terminal means also to move laterally to said direction during said relative rectilinear movement.

17. In combination: flexible force-transmitting means, including an elongated flexible member, constructed and arranged to transmit force to a desired point; terminal means, connected to one end of said flexible member, constructed and arranged to move said member longitudinally; supporting means for said terminal means, constructed and arranged to guide said terminal means for rectilinear movement; actuating means connected to said terminal means; a panel having an aperture; means for mounting said supporting means on one side of said panel; and connecting means, including a portion of said terminal means having an opening the axis of which is approximately coaxial with the axis of said aperture, so constructed and arranged that said actuating means may be operatively connected to said terminal means, solely by inserting said actuating means through said aperture from the other side of said panel and into said opening by bodily longitudinal movement of said actuating means.

18. Control apparatus, including: flexible force-transmitting means, including an elongated flexible member, constructed and arranged to transmit force to a desired point; terminal means, connected to one end of said flexible member, constructed and arranged to move said member longitudinally; means guiding said terminal means for rectilinear movement; actuating means, connected to said terminal means, so constructed and arranged that movement of said actuating means positively moves said terminal means; said terminal means and said actuating means including means so constructed and arranged that said actuating means may be quickly operatively assembled with said terminal means by solely bodily relative substantially rectilinear movement of said operating means and said actuating means in the direction for which said terminal means is guided, and quickly disconnected from said terminal means to remove said actuating means from said apparatus.

19. Control apparatus, including: flexible force-transmitting means, including an elongated flexible member, constructed and arranged to transmit force to a desired point; a terminal member, connected to one end of said flexible member, constructed and arranged to move said member longitudinally; means guiding said terminal member for rectilinear movement; an actuating member; connecting means, for said terminal member and said actuating member, so constructed and arranged that movement of said actuating member positively moves said terminal member; said connecting means including a latch on one of said members and a keeper for said latch on the other of said members, so constructed and arranged that said actuating member so moves said operating member by transmission of force through said latch and said keeper, and said operating member and said actuating member are quickly disconnectable solely by lateral pressure on said latch.

20. Control apparatus, including: flexible force-transmitting means, including an elongated flexible member, constructed and arranged to transmit force to a desired point; actuating means for moving said flexible member longitudinally; connecting means for said flexible member and said actuating member, said connecting means comprising latch means including a U-shaped portion fastened to said flexible member, said portion having apertures in the sides thereof through which said actuating means is disposed, said latch means being so constructed and arranged that said flexible member and said actuating means are quickly detachably connectable.

HARRY A. DOUGLAS.